Oct. 30, 1962        G. G. BERNARD        3,060,725
METHOD OF LOCATING LEAKS IN BURIED PIPELINES
Filed July 22, 1960
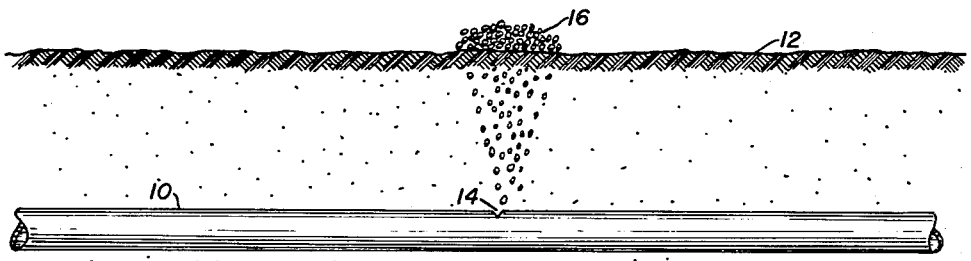
INVENTOR.
BY GEORGE G. BERNARD
ATTORNEY

3,060,725
METHOD OF LOCATING LEAKS IN BURIED PIPELINES
George G. Bernard, Crystal Lake, Ill., assignor to The Pure Oil Company, Chicago, Ill., a corporation of Ohio
Filed July 22, 1960, Ser. No. 44,619
14 Claims. (Cl. 73—40.5)

This invention is directed to a method for locating leaks in underground pipelines, and particularly in underground pipelines used for conveying water under pressure.

The prior art recognizes methods for locating leaks in underground pipelines by the injection into the pipeline of soluble dyes or radioactive substances which pass into the earth through the leaks in the pipeline and are detected at the surface of the earth. Such methods have not proved to be altogether satisfactory because the dye or radioactive tracer may flow downward through the earth rather than upward, and not be readily detectable at the earth's surface. Another drawback to such methods is that the zone surrounding the leak may be permanently contaminated with the radioactive substance or dye. The prior art further teaches the use of gases dissolved in the pipeline fluid to detect the location of leaks in submerged pipelines. While this method has proved satisfactory for detecting leaks in underwater lines where the gas produces bubbles in a body of water, it does not provide a satisfactory method for locating leaks in buried pipelines because of the difficulty of locating the escaping gas.

It is an object of this invention to provide a simple and inexpensive method for locating leaks in pressurized, buried pipelines. A more particular object of this invention is to provide a convenient means for locating leaks in pressurized water lines such as are used in oil fields for secondary-recovery and water-disposal operations.

Briefly, in accordance with the method of this invention, a small amount of a foaming agent, such as a detergent, and a quantity of a gas which is soluble in water at super-atmospheric pressures, but substantially less soluble in water at atmospheric pressure, are added continuously to pressurized water flowing through a pipeline suspected to contain one or more leaks. When the gas-detergent-water solution escapes through a leak and the pressure of the solution decreases to atmospheric pressure, foam developes in the soil and quickly rises through the soil to the surface of the earth, where it is readily observable by a person walking, riding, or flying along the route of the line.

The method of this invention will be described with reference to the drawing, which depicts a vertical section through the earth, and pipeline 10 which is buried below the surface 12 of the earth. A leak exists in the pipeline at 14. While the leak is shown at the top of the pipeline it will be understood that it may occur anywhere along the length or circumference of the pipe. In accordance with the method of this invention, when a leak is suspected to exist, a small amount of a foaming agent, and a gas which is at least partially soluble in the pipeline fluid at the existing pipeline pressure, but is considerably less soluble in the fluid at atmospheric pressure, is metered into the fluid flowing through the pipeline. The foaming agent and gas enter solution with the fluid and travel through the pipeline to the point of the leak, where a portion of the fluid passes outward through the leak ino the earth. As the fluid containing the foaming agent and gas escapes into the soil, the gas comes out of solution and a foam developes. This foam spreads upward under the rising tendency of the gas, and soon reaches the surface of the earth where it becomes visible. Thus, the solution escaping through leak 14 produces a foam which passes upward through the earth to form a visible foam deposit 16 on the surface of the earth.

In accordance with the preferred method of carrying out this invention, the pipeline remains in service and the foaming agent and gas are metered into the flowing stream continuously at the prevailing pipeline pressure until the foam is detected above one or more leaks. It is, however, contemplated that this method may be modified by closing the pipeline at the outlet end so that the flow of aqueous fluid therethrough is stopped. In this way flow in the pipeline is reduced to that quantity of fluid which escapes from the pipeline leaks.

In another modification of the method of this invention, the foaming agent may be first injected into a stream of pipeline fluid, some of which flows out of the pipeline leaks and into the earth surrounding the leaks. Thereafter, a suitable gas may be introduced into the pipeline at pipeline pressure and also finds its way through the leak and into the earth, where the gas escapes from solution and a foam is produced. Where water is the pipeline fluid, the foaming agent used may be any one of many soaps, detergents, or other surface-active agents which are capable of creating a foam when present in water in small concentrations. It is preferred that the use of soaps be limited to such instances where it is known that the water used is substantially free of hardness, i.e., magnesium and calcium salts. Where the water is very hard, it is preferred that a detergent which is compatible with hard water be employed. The use of soaps is preferred in soft water, because of their high foaming properties. Similarly, it is preferred that a highly foaming detergent be selected, where a detergent is used. Preferably, the foaming agent should be non-toxic and non-injurious to plant life, thereby avoiding some of the serious problems associated with other leak-detecting techniques, such as the use of radioactive tracers or dyes. The concentration of foaming agent employed may vary somewhat, depending upon the hardness of the water in which it is dissolved as well as the foaming tendencies or characteristics of the foaming agent itself, but usually very small concentrations in the order of about 0.001 to 0.1 percent by weight are satisfactory.

As has been before stated, the gas which is added to the fluid to cause foaming at the leak must be soluble in the fluid at superatmospheric pressures, but appreciably less soluble at atmospheric pressure, the difference in solubilities at the two pressures being sufficient to cause the release of enough free gas to cause foaming. The selection of the gas depends upon its solubility at atmospheric pressure and at pipeline pressure, but other characteristics of the gas may also be important. For example, where the pipeline is fabricated of a corrodible material, it is preferred that acidic gases and oxygen-containing gases be avoided in favor of inert or non-corrosive gases. Accordingly, hydrogen, nitrogen, helium, methane, ethane, ethylene, and acetylene are preferred where the pipeline is fabricated of a corrodible material. Gases which may be used where corrosion problems are not severe are air, oxygen, sulfur dioxide, nitrous oxide, carbon dioxide, and ammonia. Other suitable gases may readily be selected from published solubility tables.

The amount of gas added to the pipeline fluid depends upon the solubility characteristics of the gas, but quantities of gas sufficient to produce at atmospheric pressure a volume of free gas equal to about 0.1 to 10 times the volume of the fluid suffices for most purposes. In order to avoid the necessity for using very large quantities of gas, it is preferred that the gas selected have a relatively low solubility in water at atmospheric pressure. It is further preferred that the gas be injected at a rate sufficient to substantially saturate the pipeline fluid wih the gas at pipeline pressure. Thus the maximum volume of gas is dissolved per unit volume of fluid passing through the leak. It is preferred that the amount of gas which is soluble in the fluid at pipeline pressure be at least 50% greater than the amount of gas which is soluble in the fluid at atmospheric pressure. Pipeline pressures may vary widely, but are usually in the range of about 50 to 1,000 pounds per square inch absolute. It is preferred that the method of this invention be carried out at a pressure approximately equal to the usual operating pressure of the pipeline. While the method of this invention is particularly directed to the detection of leaks occurring in pipelines which normally carry water, it is evident that the method is also applicable to pipelines generally, but in such instances it is necessary to select a foaming agent which is compatible with the pipeline fluid, or to pump water through the line at least during the period of leak detection, and use a gas such as air and a foaming agent such as soap.

As a specific example of the method of this invention, a pipeline used in a secondary-recovery operation carries about 3,000 barrels of water per day for injection underground. The pump discharge pressure is 1,000 p.s.i.g. One day it is noted that the pump discharge pressure has decreased to 900 p.s.i.g., indicating that one or more leaks have probably developed in the water distribution system. Triton X–100, a commercially available detergent (an isooctyl phenyl polyethoxy ethanol having about 9 to 10 ethylene oxide groups per molecule) is metered into the water in the pipeline at a rate sufficient to produce a concentration of 0.002 percent, while at the same time, by means of a compressor, air is injected into the water at a rate of 250 standard cubic feet per hour. Each standard cubic foot of water thus treated is capable of producing about 0.3 cubic foot of foam when the pressure is reduced to atmospheric pressure. The addition of surfactant and air to the flowing stream is continued for a sufficient time to permit the treated water to become distributed throughout the system. The pipeline route is then surveyed, and foam is found on the ground at two locations, thus showing the existence and location of the leaks.

While only one detergent has been specifically named, it will be understood that a wide variety of soaps and detergents are available and may be utilized as the foaming agent in the method of this invention. Suitable foaming agents may be selected, for example, from those described in "Surfactants Listed," published in 1958, by John W. McCutcheon.

The embodiments of the invention in which a special property or privilege is claimed are defined as follows:

1. The method for locating leaks in a subterranean pipeline lying beneath the surface of the earth in substantially dry soil comprising flowing through said pipeline at superatmospheric pressure liquid containing in solution a small concentration of a foaming agent and a quantity of a gas substantially in excess of the quantity of said gas which is soluble in said liquid at atmospheric pressure, said gas being characterized as having a substantially greater solubility in said liquid at said superatmospheric pressure than at atmospheric pressure, and detecting the appearance of foam at the surface of the earth above a leak in said pipeline.

2. A method according to claim 1 in which the amount of gas in solution in said liquid at said superatmospheric pressure is at least 50% greater than the quantity of said gas which is soluble in said fluid at atmospheric pressure.

3. A method according to claim 2 in which said liquid is substantially saturated with said gas while in said pipeline.

4. A method according to claim 3 in which the quantity of said gas in solution in said liquid is sufficient to produce a volume of free gas at atmospheric pressure in the range of about 0.1 to 10.0 times the volume of said liquid.

5. A method according to claim 4 in which said liquid is water and said foaming agent is a detergent present in said fluid in the amount of 0.001 to 0.1 percent by weight.

6. A method according to claim 5 in which nitrogen is the principal constituent of said gas.

7. A method according to claim 5 in which said superatmospheric pressure is in the range of 50 to 1,000 p.s.i.g.

8. The method for locating leaks in a pipeline lying beneath the surface of the earth in substantially dry soil comprising flowing through said pipeline at superatmospheric pressure a quantity of aqueous fluid containing in solution a small concentration of a foaming agent, thereafter flowing through said pipeline at superatmospheric pressure an aqueous fluid containing in solution a quantity of a gas substantially in excess of the quantity of said gas which is soluble in said fluid at atmospheric pressure, said gas being characterized as having a substantially greater solubility in said fluid at superatmospheric pressure than at atmospheric pressure, and detecting the appearance of foam at the surface of the earth above a leak in said pipeline.

9. A method according to claim 8 in which the amount of said gas in solution in said fluid at said superatmospheric pressure is at least 50% greater than the quantity of said gas which is soluble in said fluid at atmospheric pressure.

10. A method according to claim 9 in which said fluid is substantially saturated with said gas while in said pipeline.

11. A method according to claim 10 in which the quantity of said gas in solution in said fluid is sufficient to produce a volume of free gas at atmospheric pressure in the range of 0.1 to 10.0 times the volume of said fluid.

12. A method according to claim 11 in which said foaming agent is a detergent and is present in said fluid in the amount of 0.001 to 0.1 percent by weight.

13. A method according to claim 12 in which nitrogen is the principal ingredient in said gas.

14. A method according to claim 12 in which said superatmospheric pressure is in the range of 50 to 1,000 p.s.i.g.

References Cited in the file of this patent

UNITED STATES PATENTS

| | | |
|---|---|---|
| 1,719,787 | Smith | July 2, 1929 |
| 1,825,280 | Oxer | Sept. 29, 1931 |
| 2,353,287 | Benesh | July 11, 1944 |